May 8, 1951

H. F. MATARÉ

2,552,052

PUSH-PULL CONVERTER OF THE CRYSTAL TYPE FOR ULTRA-SHORT WAVES

Filed April 21, 1948

INVENTOR:
Herbert François Mataré
By: [signature]
His Agent

Patented May 8, 1951

2,552,052

UNITED STATES PATENT OFFICE 2,552,052

PUSH-PULL CONVERTER OF THE CRYSTAL TYPE FOR ULTRA-SHORT WAVES

Hérbert François Mataré, Vaucresson, France, assignor to Societe Anonyme dite: Compagnie des Freins et Signaux Westinghouse, Paris, France Application April 21, 1948, Serial No. 22,307
In France May 23, 1947

5 Claims. (Cl. 250—20)

The present invention relates to rectifiers and, more particularly, to push-pull connected rectifiers of the crystal type employed in systems using ultra-short electric waves.

It has been known for some time that the use of push-pull connected rectifiers as detectors or mixers in systems of the character described is very advantageous, for example in the case of mixer stages for the superheterodyne reception of ultra-short carrier waves wherein, upon suitable coupling of the outputs of the antenna and of the local oscillator to the input of such stage, the radiation of the oscillator output by way of the antenna will be prevented. It is also known that, in the case of ultra-short waves of the order of ten centimeters or less, the use of rectifiers of the crystal type is very desirable. Heretofore, however, it has not been practicable to arrange rectifiers of this type as a unit suitable for push-pull operation, this being due to the fact that known methods of producing such rectifiers do not result in rectifier elements having exactly identical characteristics which is an indispensable condition for the satisfactory functioning of a push-pull type detector. In addition to perfect symmetry, the requirements for a detector or modulator suitable for ultra-short waves also include very short inter-electrode connections and extremely low distributed capacitances.

It is, therefore, an object of the present invention to provide a rectifier of the character described which meets the above requirements.

Another object of the present invention is to provide a push-pull type mixer or modulator for ultra-short waves.

A further object of the invention is to provide a crystal type rectifier adapted to be used in combination with a modulator stage of the resonant cavity type.

According to a feature of the invention, a rectifier for ultra-short waves comprises a pair of composite layers on a metal base plate and a pair of connecting electrodes each contacting one of said layers at substantially one point only.

According to another feature of the invention, a rectifier of the character described has a pair of connecting electrodes coupled capacitively to spaced portions of a cavity resonator.

The above and other objects and features of the invention will become apparent from the following description, reference being had to the accompanying drawing in which.

Figure 1:
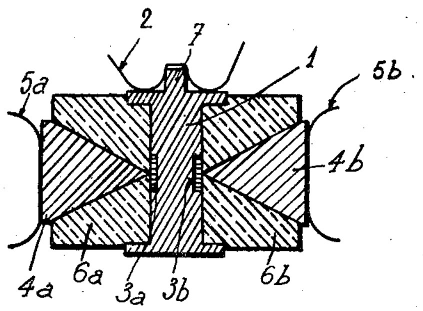
Fig. 1 illustrates a push-pull crystal detector according to the invention, shown in elevational cross section.

Referring first to Fig. 1, there is shown a metallic base plate 1 serving as a cathode and provided with a spring or contact element 2. The opposite faces of this base plate 1 are provided with composite crystalline layers 3a, 3b, respectively, of equal thickness, these layers having outer surfaces forming barrier layers or barrier surfaces. The formation of these barrier layers may be carried out by any known method and preferably takes place in a single operation. The composite layers may be produced by precipitating crystalline needles directly upon layers of germanium, silicium, copper or other semiconductive material, for example, by methods utilized in the manufacture of rectifiers of the copper oxide type, as by vaporization of a suitable material or by electrolytic deposition. It is actually possible to produce composite layers of predetermined and identical properties on both sides of the metal base plate in the course of a single operation. In accordance with the invention, the two layers are embedded in the metal base 1 in such a manner that the series resistance thereof becomes as small as possible.

The two connecting electrodes or anodes 4a, 4b are formed by providing bodies 6a, 6b of insulating material having conical cavities and filling these cavities with a substantially non-oxidizable metal such as tin, copper, silver, gold and so forth. The insulating pieces 6a, 6b should be of the highest quality in regard to the frequencies utilized, that is to say they should consist of a dielectric material having low inductivity and a small loss factor. They may consist of ceramic material such as steatites or they may consist of synthetic resins or other material which is capable of withstanding ultra-high frequencies.

It is clear that the process of filling and the type of metal employed for the electrodes 4a, 4b will vary depending on whether one or the other of the above classes of insulating material are used, in view of the thermal and mechanical differences between these materials. In the case of a steatite, it will be possible to use a metal having a relatively high melting point and to pour the same into the cavity. It will also be possible to use a metal in comminuted form and to compact the particles by a baking or fusing process. In the case of synthetic resins, if the electrode material is to be poured, a metal or alloy of relatively low melting point should be used. It will likewise be possible to use a mechanical process similar to riveting or hammering. Generally, any suitable technological process may be employed in the formation of the electrodes 4a and 4b.

The metal base plate 1 which supports the two crystalline layers 3a, 3b constitutes the desired very short connection between these layers; at the same time it acts as a mutual screen between the two anode electrodes 4a and 4b, thus effecting a reduction of the capacitance $C_q$ (Fig. 3) existing between these electrodes. It will be understood that the member 1 may be dimensioned in such a manner that the resulting inter-electrode capacitance will have the value required to tune the rectifier assembly to a desired resonance frequency, which may be of particular interest in the case of detectors or modulators for ultra high frequencies.

Figure 2:
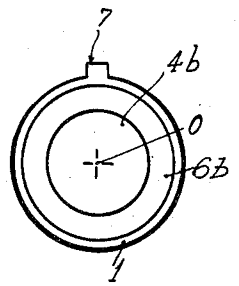
Fig. 2 is an end view of the detector shown in Fig. 1.

As shown in Fig. 2, the detector is assembled as a unit which is centrally symmetrical with respect to the axis O, except for a projection 7 provided on the base plate 1. This projection is a convenient means for effecting a cathode connection with the aid of the contact element 2, such a connection being of particular interest in the case of an assembly such as that illustrated by way of example in Fig. 4.

Figure 3:
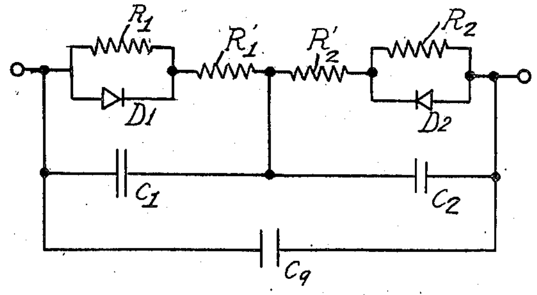
Fig. 3 is a diagram showing the equivalent circuit of the detector illustrated in Figs. 1 and 2.

Fig. 3 represents the equivalent circuit diagram corresponding to a push-pull detector according to the invention. Therein, $D_1$ and $D_2$ are ideal unidirectional conductors or rectifiers devoid of any losses of capacitance; $R_1$ and $R_2$ are the ohmic resistances preferably including any external resistances to be considered in connection with the impedance of the system; $C_1$ and $C_2$ are the parallel capacitances; $R_1'$ and $R_2'$ are the respective series resistances which exist at the boundary layers and are due to the contact between the semi-conductor and the counter-electrode. It will be noted that the magnitudes of $R_1$, $C_1$ and $R_1'$ associated with $D_1$ are equal, respectively, to the magnitudes of $R_2$, $C_2$ and $R_2'$ associated with $D_2$, owing to the arrangement according to the invention. Finally $C_q$ represents the external capacitance whose absolute value may be appreciably reduced by virtue of the arrangement herein proposed.

It will be appreciated that a push-pull detector according to the invention offers not only the advantage of suppressing the radiation of the oscillator output by way of the antenna, but also effects a suppression of the background noises of the oscillator.

The use of the detector described is particularly advantageous in connection with oscillatory circuits using resonant cavities. In such a case it will be possible to obtain high-frequency coupling between the two anode electrodes 4a and 4b on the one hand and adjacent plates or elements of the cavity resonator on the other.

Figure 4:
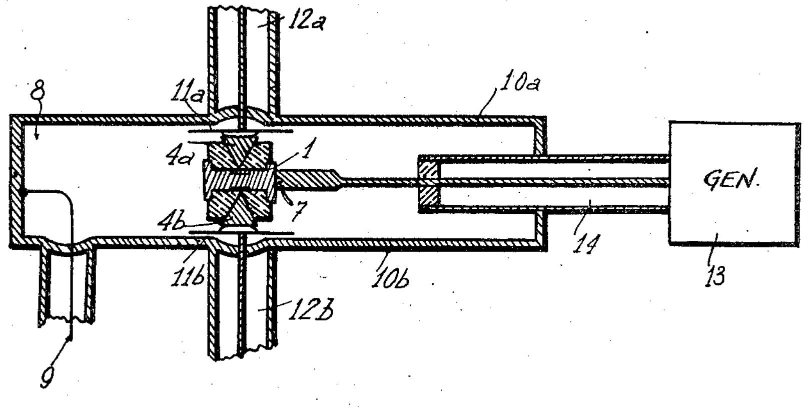
Fig. 4 shows the detector of Fig. 1 combined with a mixer stage of the resonant cavity type designed for ultra-short waves.

Fig. 4 shows schematically a mixer stage for ultra-short waves comprising an oscillatory circuit utilizing a resonant cavity.

The cavity resonator 8, having the cross section of a flattened cylinder, is excited by the received wave through an antenna loop 9. As a result there will be set up alternating potentials of opposite phase on the plates 10a, 10b which form the flattened portions of the cavity, relative to the potential obtaining in the plane of symmetry. The two electrodes 4a and 4b of the detector, disposed at opposite sides of the axis of symmetry of the resonator, are capacitively coupled to the plates 10a, 10b, respectively, by means of armatures 11a and 11b; on the other hand, these electrodes are also connected by means of two coaxial conductors 12a and 12b to a push-pull connected intermediate-frequency device (not shown). The oscillator frequency is supplied by the generator 13, by way of a line 14, to the plane of symmetry represented by the base plate 1 which supports the crystalline semi-conductive layers.

It will thus be seen that the detector is driven in push-pull by the received frequency and in parallel excitation by the oscillator frequency, the intermediate frequency being extracted in push-pull.

The forms of the invention specifically shown and described herein are given merely by way of illustration and not as a limitation upon the scope of the invention and defined in the appended claims.

What is claimed is:

1. A push-pull rectifier of the crystal type for ultra short electric waves, comprising a metal base plate, a pair of electrically identical semi-conductive layers on opposite faces of said base plate, the outer part of said layers forming barrier layers, a pair of connecting electrodes each making contact directly with one corresponding barrier layer at substantially one point only, a third electrode connected to said base plate and bodies of insulating material embedding respectively each of said pair of electrodes and overlaying respectively each of said barrier layers and the major portion of the surface of said base plate on which is mounted the corresponding semi-conductive layer.

2. A rectifier according to claim 1 wherein said connecting electrodes are of substantially conical shape bearing with the pointed ends upon said barrier layers, respectively.

3. A push-pull rectifier of the crystal type for ultra-short electric waves, comprising a metal base plate having two parallel faces each provided with a recess, said two recesses being of the same depth, a semi-conductive layer embedded in each of said recesses, the outer part of said layers forming barrier surfaces, a pair of bodies of insulating material each in contact with one corresponding barrier surface and overlaying the major portion of the corresponding surface of said base plate in which are inserted said semi-conductive layers, each of said bodies being provided with a substantially conical cavity open at its pointed end toward the barrier surface of the corresponding semi-conductive layer, and a pair of substantially conical connecting electrodes each filling one of said cavities and conductively contacting the barrier surface of said corresponding semi-conductive layer at said pointed end.

4. A modulator stage for ultra-short waves, comprising a cavity resonator, input means adapted to apply an electric wave in opposite phase to spaced portions of said resonator, a rectifier according to claim 1 disposed in said resonator, coupling means capacitively coupling each of said connecting electrodes to a respective one of said spaced portions, a source of oscillations, connector means arranged to apply said oscillations between said base plate on one hand and said two portions in parallel on the other, and output means connected in push-pull across said connector electrodes on one hand and said spaced portions on the other.

5. A modulator stage according to claim 4 wherein said cavity resonator is of substantially cylindrical configuration having opposite flattened portions, said flattened portions representing said spaced portions, respectively.

HÉRBERT FRANÇOIS MATARÉ.

REFERENCES CITED

The following references are of record in the file of this patent:

UNITED STATES PATENTS

| Number | Name | Date |
|---|---|---|
| 1,998,119 | Cox | Apr. 16, 1935 |
| 2,156,660 | Van Geel | May 2, 1939 |
| 2,162,740 | Mirick | June 20, 1939 |
| 2,367,943 | Hein | Jan. 23, 1945 |
| 2,406,405 | Salisbury | Aug. 27, 1946 |
| 2,433,566 | Lamb | Dec. 30, 1947 |
| 2,438,893 | Bieling | Apr. 6, 1948 |
| 2,468,845 | Thompson | May 3, 1949 |